Dec. 8, 1959     C. P. GINSBURG ET AL     2,916,546
VISUAL IMAGE RECORDING AND REPRODUCING SYSTEM AND METHOD
Filed May 3, 1954     8 Sheets-Sheet 4
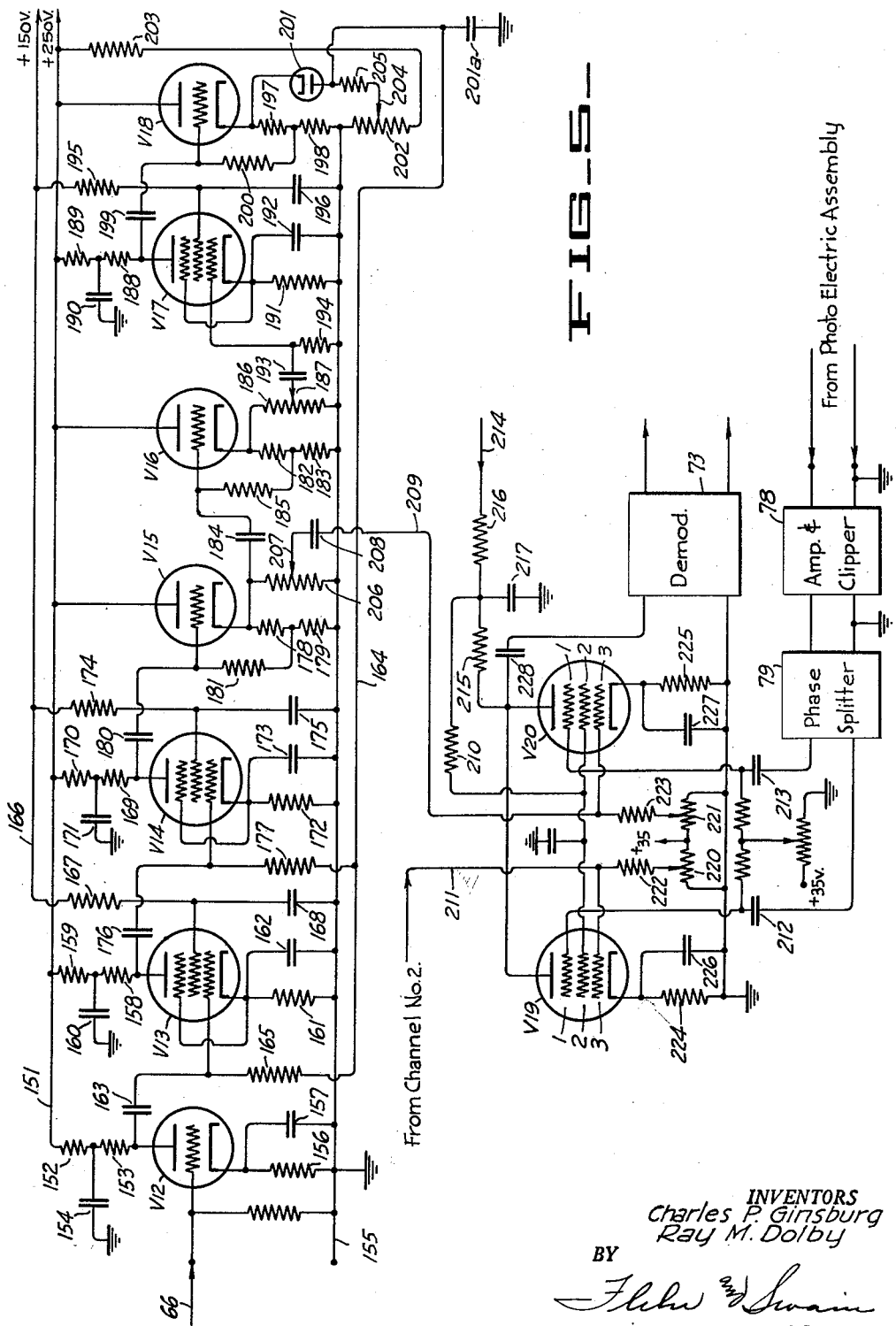
INVENTORS
Charles P. Ginsburg
Ray M. Dolby
BY
ATTORNEYS Dec. 8, 1959     C. P. GINSBURG ET AL     2,916,546
VISUAL IMAGE RECORDING AND REPRODUCING SYSTEM AND METHOD
Filed May 3, 1954                         8 Sheets-Sheet 5
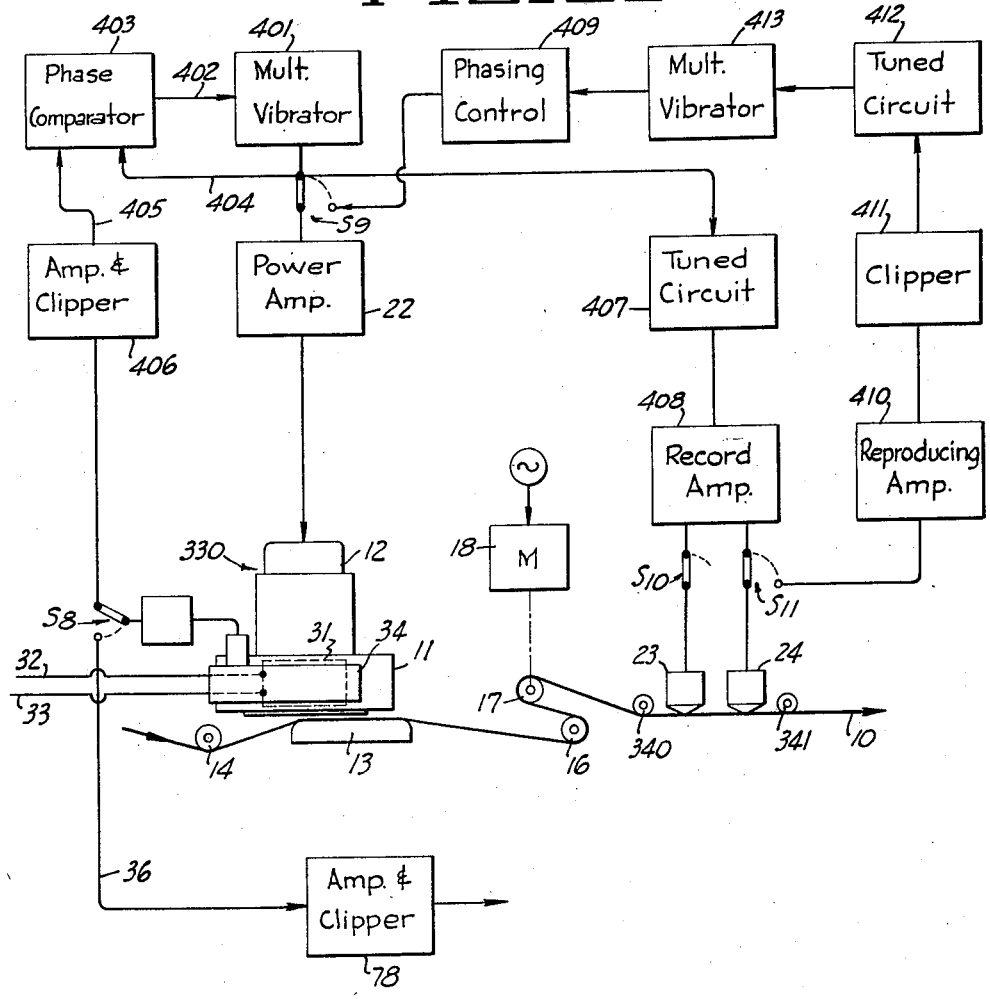
INVENTORS
Charles P. Ginsburg
Ray M. Dolby
BY
ATTORNEYS

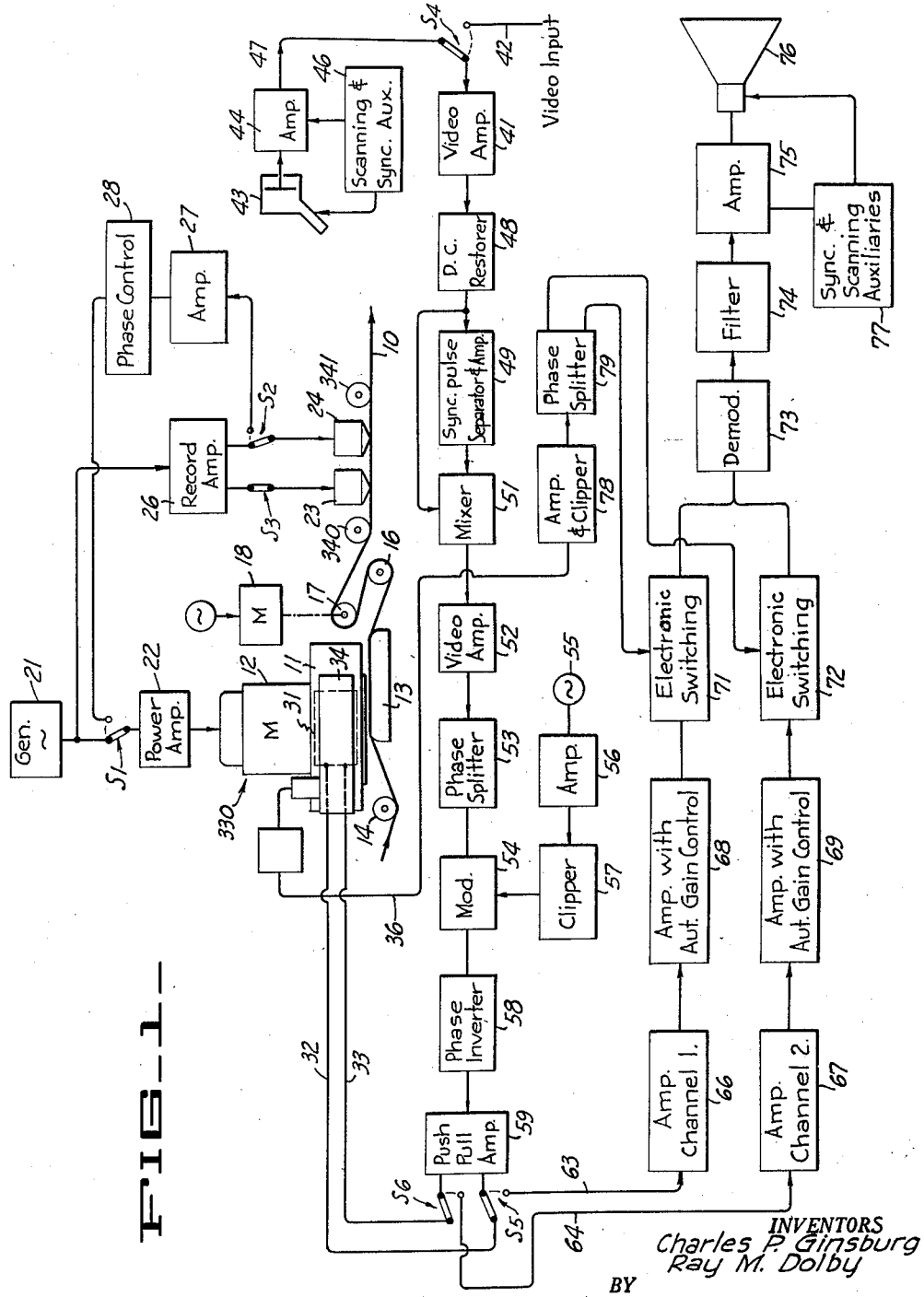

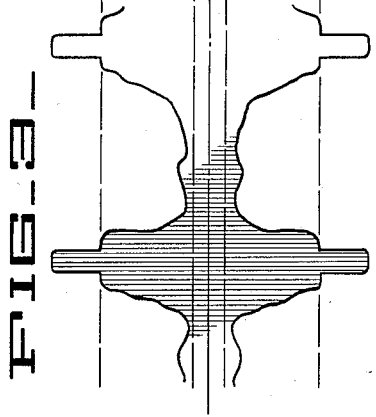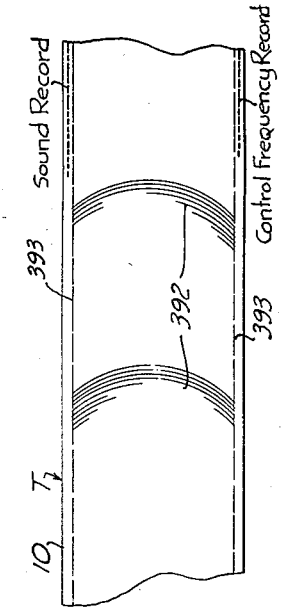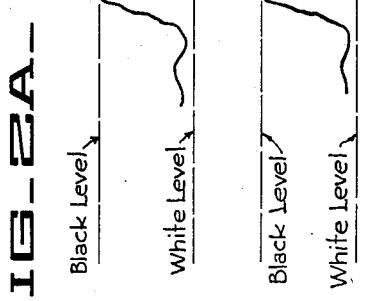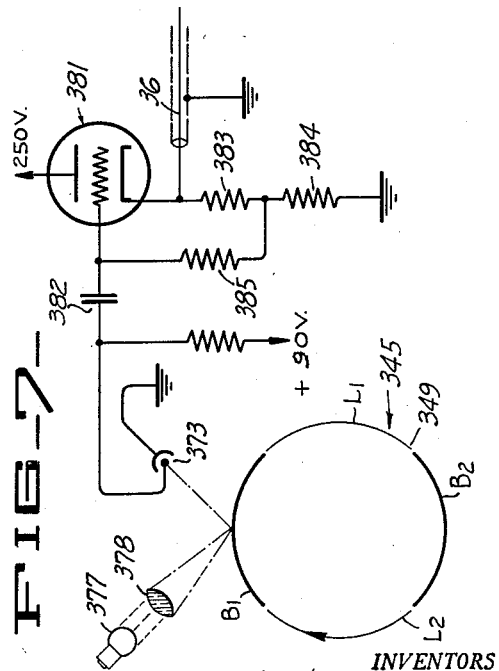

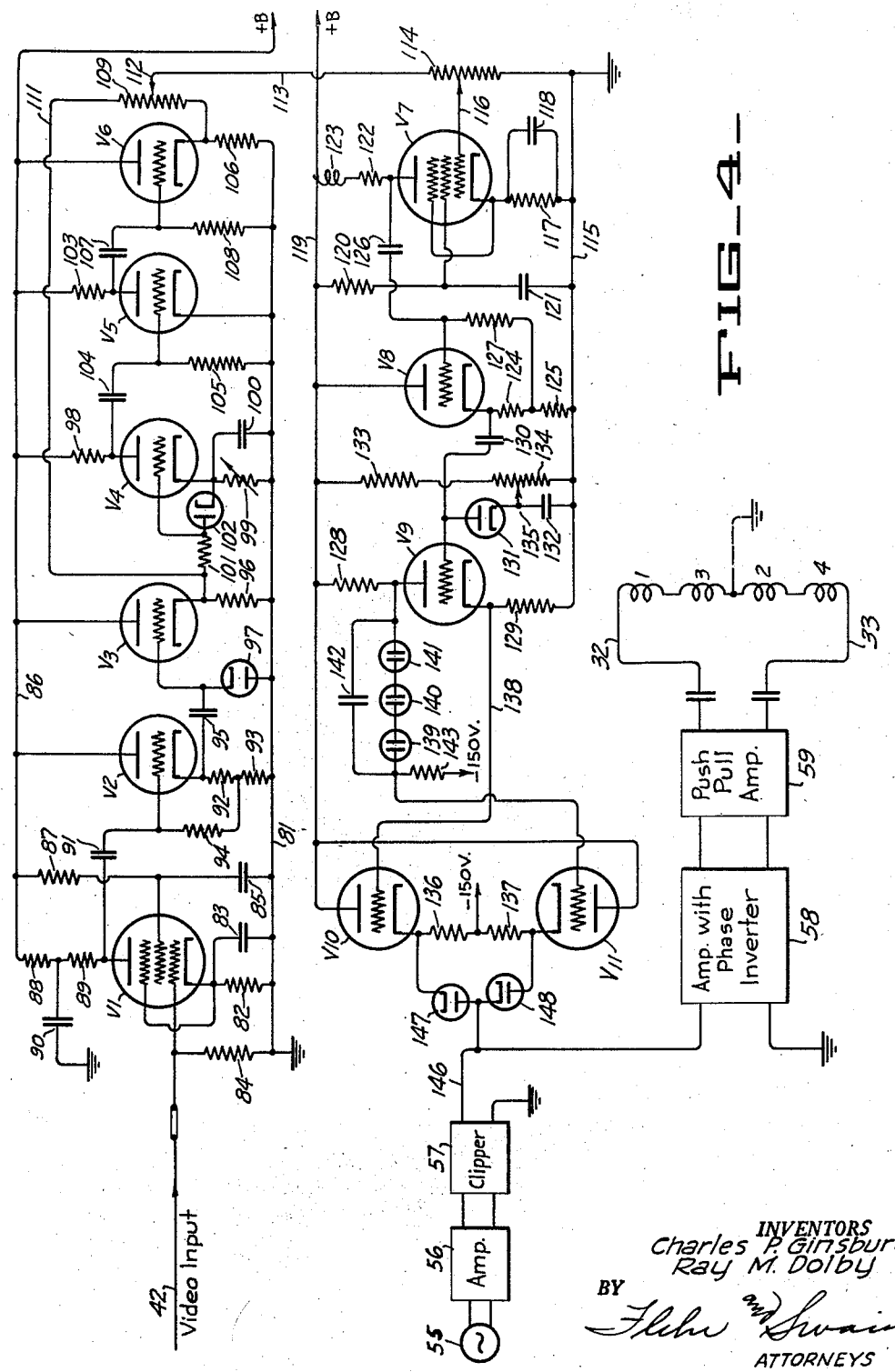

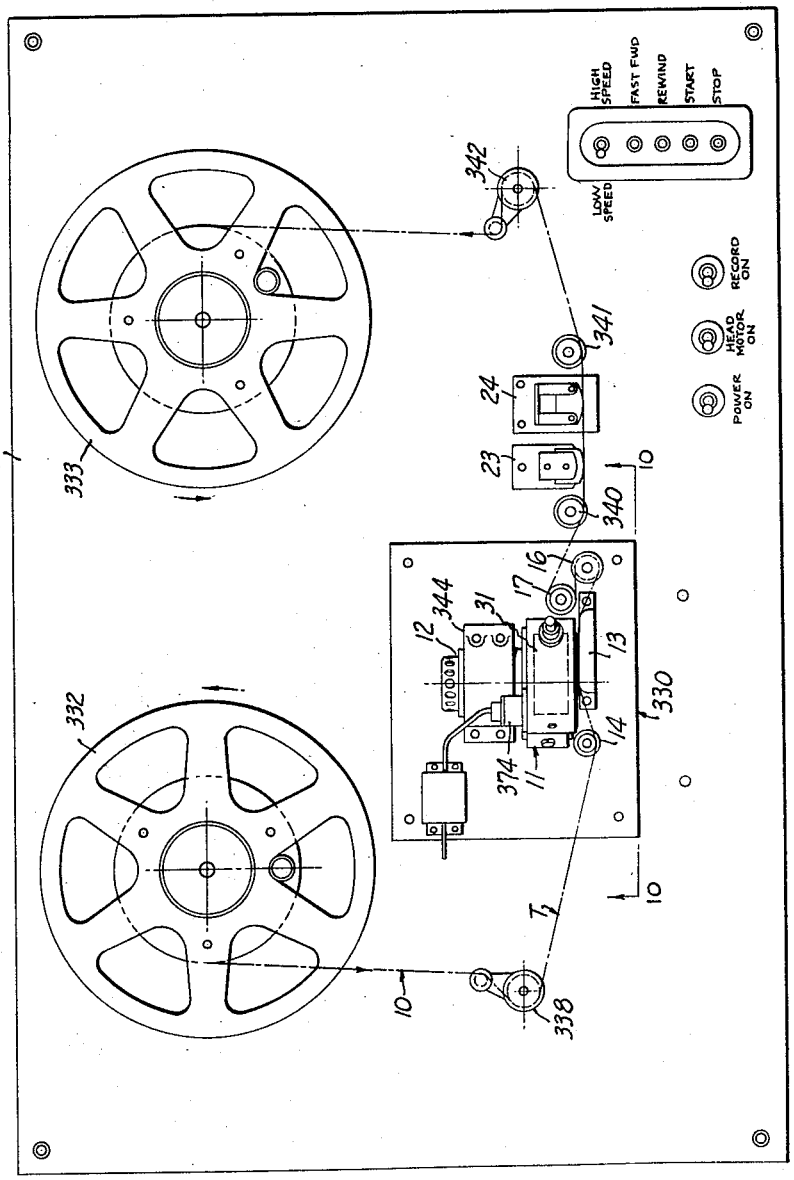

Dec. 8, 1959   C. P. GINSBURG ET AL   2,916,546
VISUAL IMAGE RECORDING AND REPRODUCING SYSTEM AND METHOD
Filed May 3, 1954                                8 Sheets-Sheet 7
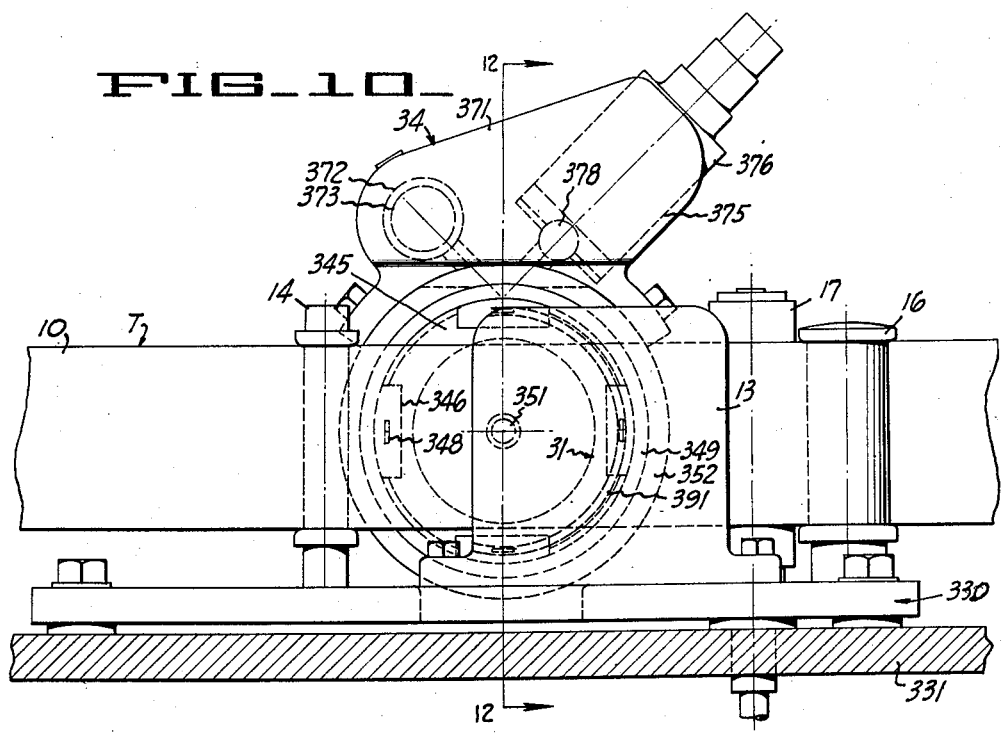
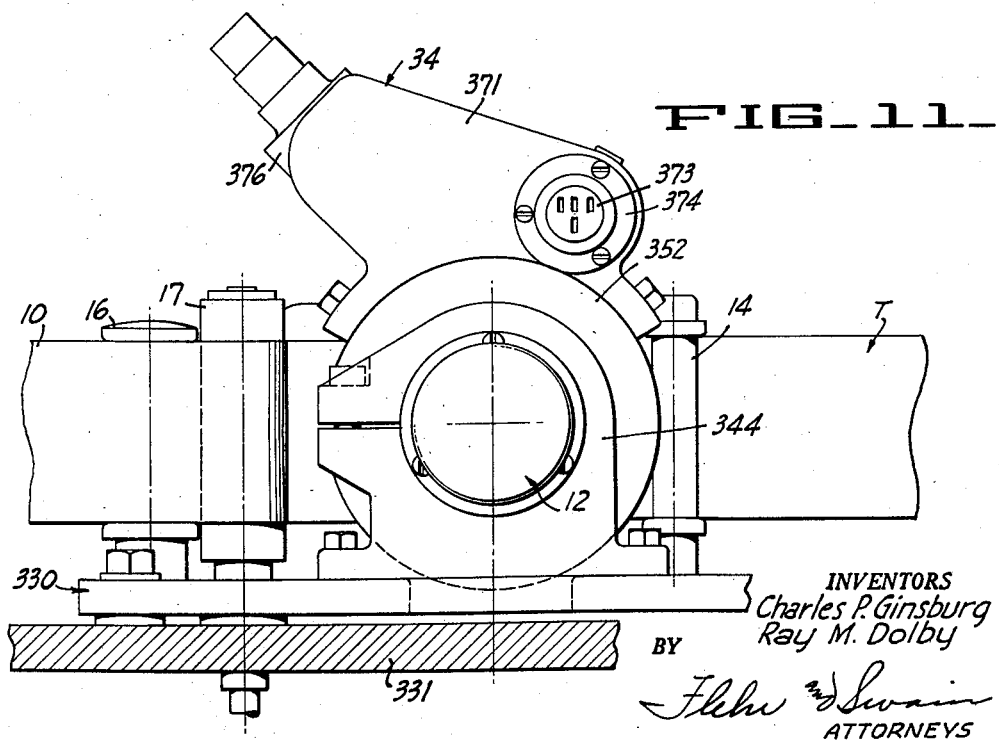
INVENTORS
Charles P. Ginsburg
Ray M. Dolby
BY
ATTORNEYS

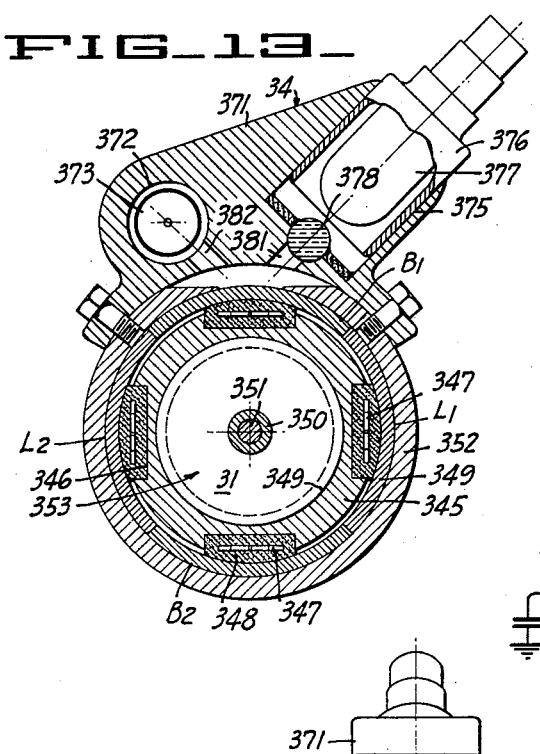
FIG_13_
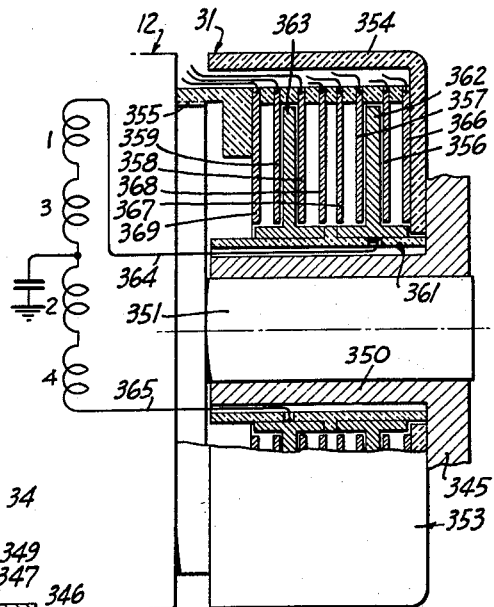
FIG_14_
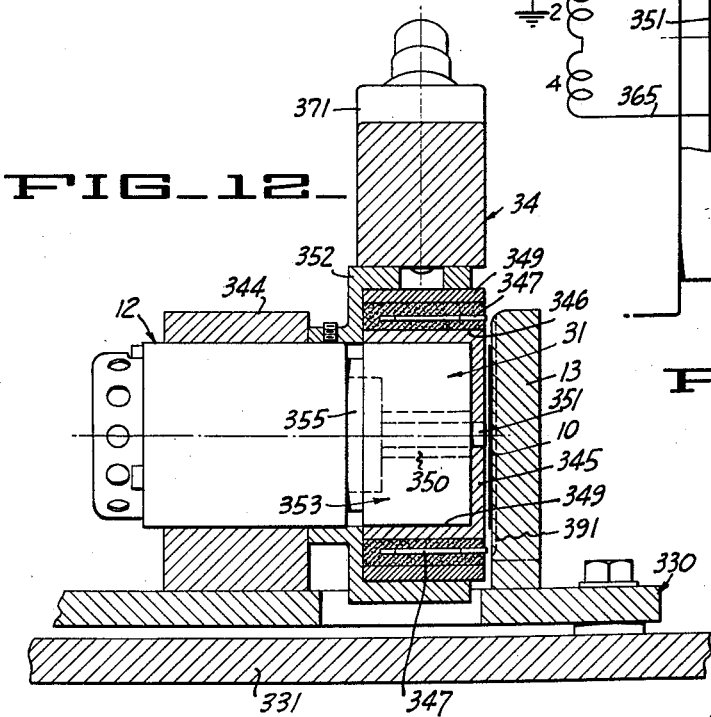
FIG_12_
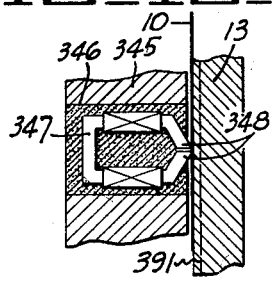
FIG_15_
INVENTORS
Charles P. Ginsburg
Ray M. Dolby
BY
ATTORNEYS

United States Patent Office 2,916,546
Patented Dec. 8, 1959

2,916,546

VISUAL IMAGE RECORDING AND REPRODUCING SYSTEM AND METHOD

Charles P. Ginsburg, Los Altos, and Ray M. Dolby, Redwood City, Calif., assignors to Ampex Corporation, Redwood City, Calif., a corporation of California Application May 3, 1954, Serial No. 427,138

8 Claims. (Cl. 178—6.6)

This invention relates generally to systems and methods for the recording and/or reproduction of visual images. More particularly it relates to systems and methods of the type in which the recording is made on an electromagnetic tape.

The prevailing method employed for recording images of the television type is to photograph the image on the television screen by the use of a suitable motion picture camera. One difficulty with this method is that it requires processing of the motion picture film before the record can be reproduced. Also a photographic record cannot be erased for re-use. In many instances it would be desirable to provide a radio signal record which would not require processing before its reproduction, and which would employ a record medium capable of being erased and re-used a large number of times. Recording by the use of a magnetic tape has been developed to a high degree of technical perfection, particularly as applied to audio signals. However, application of this technique to visual image recording has been deemed impractical because of inherent limitations. Particularly the frequency spectrum required for video signals is far greater than that which can be successfully recorded on present day magnetic tape equipment, where the record is applied on a track extending parallel to the length of the tape. Although in the foregoing applicants are referring particularly to video signals such as are used in standard American television broadcasting, it should be understood that there are other instances where it is desirable to record visual images, as for example for the recording of radar screen images, and the like.

In general it is an object of the present invention to provide a system and method for the recording and reproduction of visual images, and which employs a record of the electromagnetic tape type.

A further object of the invention is to provide a system and method of the above character having a novel means and procedure for forming an electromagnetic video signal record, and which makes possible the recording of a relatively wide frequency spectrum.

Another object of the invention is to provide a system and method of the above character making use of novel rotary magnetic means for recording video signals on a magnetic tape.

Another object of the invention is to provide a system and method of the above character having novel means for reproducing electromagnetically recorded video signals, and which in particular makes possible continuous uninterrupted reproduction from a plurality of adjacent record tracks extending crosswise of the magnetic tape.

A further object of the invention is to provide a novel reproducing system and method of the above character which utilizes adjacent record tracks extending crosswise of a magnetic tape, and which makes possible continuous reproduction of the desired signal variations without reproduction of record track portions representing duplicate recording.

Another object of the invention is to provide a system of the above character having a novel means and method for controlling the driving of the magnetic head.

Another object of the invention is to provide a system of the above character having a novel network for amplification of reproduced signal energy, and which in particular makes possible the use of a plurality of magnetic reproducing devices.

Another object of the invention is to provide novel magnetic recording and playback means making use of a rotary magnetic head, and having novel commutating means.

Another object is to provide for effective magnetic tape recording of video signals together with synchronizing pulses.

Another object of the invention is to provide a magnetic tape record of video signals and synchronizing pulses, together with sound and control frequency tracks.

Additional objects and features of the invention will appear from the following description in which the preferred embodiments have been set forth in detail in conjunction with the accompanying drawing.

Referring to the drawings:

Figure 1 is a block diagram illustrating a complete system incorporating the present invention.

Figures 2A and 2B illustrate wave forms of a typical video signal.

Figure 3 illustrates a typical modulation envelope including picture information and synchronizing pulse extensions.

Figure 4 is a circuit diagram illustrating that part of the system serving to record picture information upon a magnetic tape.

Figure 5 is a circuit diagram showing that part of the general system for the reproduction of picture information.

Figure 6 is a block diagram illustrating a modified arrangement for controlling the speed of the rotary head.

Figure 7 is a schematic diagram illustrating the photo electric pulse generating means.

Figure 8 illustrates the magnetic record used in the present system.

Figure 9 is a plan view illustrating the rotary magnetic head and associated equipment for recording and reproducing operations.

Figure 10 is a detail taken along the line 10—10 of Figure 9, on an enlarged scale.

Figure 11 is a detail similar to Figure 10, but looking toward the opposite end of the rotary head.

Figure 12 is a cross-sectional detail taken along the line 12—12 of Figure 10.

Figure 13 is a cross-sectional detail taken along the line 13—13 of Figure 12.

Figure 14 is an enlarged detail showing commutating means of the capacitator type for making effective connection between the magnetic units of the rotary head and external connections.

Figure 15 is a cross-sectional detail illustrating one of the magnetic units sweeping across the magnetic tape.

The complete system illustrated schematically in Figure 1 consists of a magnetic tape recording and reproducing unit, which makes use of the magnetic tape medium 10. As will be presently explained in greater detail, the magnetic tape preferably has a substantial width, as for example a width of the order of 2 inches. Its construction can be similar to that commonly used for high fidelity recording of audio signals, namely, a thin film of pliable plastic material having a homogeneous magnetic coating upon one side of the same.

In a conventional magnetic tape recorder and/or reproducer, the tape is moved at a predetermined linear speed, while the magnetic head remains stationary. In the present instance the tape is moved at a predetermined linear speed and the magnetic head 11 rotates at a relatively high speed. As will be presently explained in greater detail, the magnetic head includes a plurality of circumferentially spaced magnetic recording and/or reproducing units which successively sweep transversely across the width of the tape, as the head rotates. The speeds employed are such that the magnetic devices sweep across narrow track areas which are spaced a small amount in the direction of the length of the tape. The magnetic head is driven by the synchronous induction motor 12, and this motor in turn is energized from a suitable source of alternating current, preferably a source which is regulated to maintain a desired predetermined driving speed.

As means for guiding the tape in cooperative relation with the rotating head 11, Figure 1 illustrates a guide plate or platen 13 which is disposed adjacent the head, together with the tape guiding stud 14, the guiding roller 16, and the driving capstan 17. The capstan is driven at a constant speed by the electric motor 18, which in turn is supplied with alternating current of a constant frequency. The ends of the tape are extended to supply and take up reels, which are carried by suitable turntables.

As suitable means for controlling the excitation of the motor 12 during recording and playback operations, we have shown an oscillation generator 21, together with a power amplifier 22. Assuming proper positioning of the switch S1, oscillations of a fixed frequency from the base oscillator 21 are supplied to the input of the amplifier 22, to provide an alternating current output having sufficient power for driving the motor 12.

Supplemental erase and recording heads 23 and 24, which are stationary, and which are disposed to operate along one margin of the tape, serve to make a tape record of the motor driving frequency. Thus frequency is taken from generator 21, and after amplification at 26, is applied to the recording head 24, through the switch S2. A suitable supersonic erase frequency can be supplied to erase head 23, through switch S3, and the same frequency can be used to supply high frequency bias to head 24.

For reproducing operations the switches S1, S2 and S3 are moved to the operating positions shown in dotted lines. This serves to connect the input of amplifier 27 with the head 24, which has its output connected through the phasing control 28 with switch S1 and the input of the power amplifier 22. Thus reproduced frequency is employed to excite the motor 12 for reproducing operations, thereby driving the motor at the same speed as employed for recording. Phase control 28 is a phase adjusting means to facilitate changing the phase relationship between the instantaneous position of the rotary head 11 and control frequency record, thus facilitating making small changes in phase relationship such as may be necessary to properly track the magnetic devices upon the record tracks. With the system of Figure 1 the motor 18 is driven from ordinary 60-cycle current supply. In one instance the capstan 17 was driven to move the tape at a speed of 30 inches per second, although lower speeds, such as from 22 to 30 inches per second, can be used. The rotary head 11 may be driven at a speed of 14,400 r.p.m. whereby each head unit sweeps across the tape at a velocity of 1800 inches per second, and the exciting current for the motor may be at a frequency of 240 c.p.s.

Suitable commutating means 31, such as one of the capacity type (to be presently explained in detail), is associated with the head 11, and serves to form an effective connection between the magnetic devices carried by the head and the leads 32 and 33.

In addition, a photoelectric means 34 is associated with the head 11, and serves to apply successive pulses to the lead 36 that are precisely synchronized with respect to the rotation of the head. As will be presently explained, these pulses are used to perform a switching operation.

The electronic network which is used for recording can consist of a video amplifier 41 to which video signals can be applied by way of the input 42. As a possible source of video signals, we have schematically illustrated an iconoscope tube 43, which is connected to the line amplifier 44. The tube and the amplifier connect with the customary scanning and synchronizing auxiliaries 46. The output 47, which has a wave form corresponding to the visual image being transmitted, is applied to the input of amplifier 41 through switch S4. The output of the video amplifier 41 is applied to the D.C. restorer 48, which connects with the synchronizing pulse separator and amplifier 49. Suitable circuitry for devices 48 and 49 will be presently described in detail. Briefly, however, the device 49 serves to separate the synchronizing pulses from the video wave form, and to separately amplify such pulses for application to the mixer 51.

We separately amplify the synchronizing pulses to provide a subsequent composite wave form which has extended portions representing the synchronizing pulses. With standard American television practice and as shown in Figure 2, the height of that portion of the wave form representing synchronizing pulses can be about 25% of the total height of the wave form as measured from the base line representing maximum white level. Assuming that the wave form is so proportioned as it leaves the D.C. restorer 48 (i.e. as in Figure 2), from the mixer 51 the wave form can be such that the upper extensions representing the synchronizing pulses can be 50% or more of the total wave form height from the maximum white level as shown in Figure 3. Video amplifier 52 serves to amplify the modified composite wave form, and to apply the signal to the phase splitter 53, which has its output applied to the modulator 54.

A carrier frequency is applied to the modulator 54, and preferably the carrier source is clipped to facilitate linear modulation. As a carrier source we have shown an oscillation generator 55, amplifier 56, and clipper 57, the latter serving to clip the wave form from the amplifier output. The modulated carrier signal from the modulator 54 is applied to the phase inverter 58, to provide a suitable signal for application to the push-pull amplifier 59. The two output leads from the amplifier 59 are connected to the leads 32 and 33 by the switches S5 and S6.

By changing the position of switches S5 and S6 to the dotted line positions, the leads 32 and 33 from the rotary head can be conneeaed to the reproducing electronic network. As illustrated in Figure 1, leads 63 and 64 extend from the switches S5 and S6 to the first and second amplifier channels 66 and 67. Amplifiers 66 and 67 connect with the automatic gain control amplifiers 68 and 69, which have their outputs connected to the electronic switching or gating means 71 and 72. Signals passed by the switching means 71 and 72 are combined and applied to the demodulator 73.

The output from the demodulator is shown being passed through the filters 74, and then amplified at 75, for application to the television tube 76. In accordance with standard American television practice the amplifier 75 and tube 76 are shown associated with the synchronizing and scanning auxiliaries 77, which includes the horizontal and the vertical sweep generators, and means for utilizing the synchronizing pulses for maintaining proper synchronization.

The switching pulses utilized by the electronic switching means 71 and 72 are obtained from the photoelectric means 34. Thus lead 36 is connected with the amplifier and clipper 78, the output of which is applied to the phase splitter 79 to provide successive timed pulses of rectangular wave form for application to the electronic switching devices 71 and 72.

Operation of the system described above can be summarized as follows: The magnetic tape is driven at a constant speed by the motor 18, and the rotary magnetic head 11 is driven at a constant speed by motor 12. Assuming that the system is being used to make a record, all of the switches are in the positions shown in solid lines, and the frequency for driving motor 12 is derived from the generator 21. Assuming that the rotary head 11 contains four recording and/or reproducing units, which are spaced 90° apart, then as the head rotates in conjunction with linear motion of the tape, the units sweep successively across one side of the tape, each sweep providing an arcuate recording track. The tracks made by the successive units are spaced a short distance apart in the direction of the length of the tape. The width of the tape with respect to the sweep of the magnetic unit is such that along both margins of the tape duplicate recording takes place. In other words, as each magnetic unit approaches the margin of the tape it arrives at a point where the subsequent recording to complete the track is duplicated by the next succeeding magnetic unit as it passes over the other tape margin. Alternate magnetic units are serially connected between one or the other of leads 32—33, and a point of neutral potential. As will be presently explained, this connection is through capacitative communicating means, and is between one or the other of leads 32, 33 and ground. In accordance with techniques well known to those familiar with television equipment, the tube 43 provides an input for the video amplifier 41 which has a wave form corresponding to the image being scanned. By virtue of the synchronizing pulse separator and amplifier 49, together with mixer 51, the amplitude of the synchronizing pulses relative to that portion of the wave form representing the visual image, is increased. In modulator 54 a fixed carrier frequency suitable for recording, as for example a frequency higher than the upper limit of the frequency spectrum which it is desired to reproduce, is amplitude modulated by the video wave form to provide an amplitude modulated output. The modulation envelope of this output corresponds to the wave form applied to the amplifier 41, except that it contains a mirror image of the picture information and the synchronizing pulses have been intensified. The output of the push-pull amplifier 59 is applied to leads 32 and 33, and therefore applied to the magnetic units on the head 11. This composite signal is therefore recorded electromagnetically upon the tape, the record track being in the form of successive arcuate portions as previously described. Because of the relatively high speed of movement between each magnetic unit and the tape, a wide frequency spectrum can be effectively recorded as for example spectrums ranging from 0 c.p.s. to 2.5 megacycles.

As is well known to those familiar with electromagnetic recording tape, the characteristic magnetization curve for a magnetic tape has a relatively linear portion and an upper and lower curved portion. It is desirable for the signal amplitude applied to the tape to be such that variations representing the image are recorded within the linear portion, and that synchronizing pulses be recorded in the curved portion near saturation. This recording method is permissible and desirable with synchronizing pulse intensification as previously described.

Assumng that a record has been made in the manner described above, the tape is rewound, and the various switches S1–S6 placed in their dotted line positions. The motor 12 is now driven by frequency reproduced by the magnetic head 24, and the capstan 17 is again driven by the same 60-cycle current supply. The magnetic units of the rotary head are caused to track upon the previous recording, whereby electrical current variations are induced in the windings of the magnetic units to provide signal variations on the leads 32 and 33. Any slight out of phase relationship between the magnetic units and the recorded track is corrected by an adjustment of the phase control 28. Signal variations applied to the leads 32 and 33 are separately amplified in the channels 66 and 67, to provide signals of equal amplitude from the outputs of the amplifiers 68 and 69. Such signals are applied successively to the electronic switching devices or gates 71 and 72, which are operated alternately by pulses from the photoelectric means 34. Switching is such as to pass all of the signal representing the visual image to the demodulator 73. Portions of the track on which recording has been duplicated, and which remain after marginal erase and record operations for recording control and audio frequencies, are eliminated. The demodulated signal from 73 can be used in any desired way to reproduce the visual image. The filter 74 is preferably adjusted to reject a spurious frequency introduced by virtue of full wave detection of the carrier, thus avoiding any disturbance to the reproduced visual image. The tube 76, in conjunction with amplifier 75 and the auxiliaries 77 reproduce the image in the same manner as a standard television receiver.

In general the system of Figure 1 provides a method for the recording of visual images electromagnetically on a magnetic tape, and reproducing the image thus recorded. The recording arrangement does not have the frequency spectrum limitations of conventional magnetic tape recording. The video signal is recorded on a single track, together with the synchronizing pulses. A sound track can be separately recorded along one margin of the tape, and reproduced in accordance with conventional magnetic tape practice.

Figure 4 illustrates a suitable electronic network which can be used for the recording operations. The vacuum tubes employed in this network have been identified as V1 to V11, inclusive. Tube V1 functions as a video amplifier, while tube V2 is a cathode follower in conjunction with elements forming a D.C. restorer circuit. Tubes V3 and V4 are amplifiers in conjunction with a synchronizing pulse separator circuit. Tube V5 serves to amplify and clip synchronizing pulses, and tube V6 is a cathode follower stage which supplies a mixer. Tube V7 forms a video amplifier together with the cathode follower V8. Tube V9 forms a part of a phase splitting circuit to provide an output for the push-pull amplifier tubes V10 and V11.

More specifically, tube V1 can be of the type provided with plate, cathode, control grid, screen grid, and suppressor grid elements. The cathode connects with the grounded lead 81 through the biasing resistor 82, the latter being shunted by the bypass condenser 83. The cathode is directly connected to the suppressor grid. The control grid is connected to the input lead 42, and to ground through the grid leak resistor 84. A bypass condenser 85 connects between the screen grid and ground, and the screen grid is connected to the plate voltage supply lead 86 through the resistor 87. The plate of tube V1 also connects with the lead 86 through the series connected resistors 88 and 89, and the point of connection between these resistors is connected to ground through the bypass condenser 90. The circuitry thus described forms a video amplifier capable of amplifying the video waveform to a high degree of fidelity.

Tube V2 can be a triode, with its plate directly connected to lead 86. The control grid is connected to the plate of tube V1 through the coupling condenser 91. The cathode of tube V2 connects to grounded lead 81 through the series resistors 92 and 93. Grid leak resistor 94 connects between the control grid and the point of connection between resistors 92 and 93. The control grid of tube V3 is coupled to the cathode of tube V2 through the condenser 95. The plate of tube V3 is directly connected to the lead 86, and the cathode connects to the ground lead 81 through the biasing resistor 96. A diode 97 of the crystal type has its cathode connected to the control grid of tube V3, and its plate connected to grounded lead 81. The diode 97, in conjunction with condenser 95 forms a D.C. restorer circuit.

This circuit keeps the average D.C. grid potential of tube V3 at a value determined by the peak of the synchronizing pulse amplitude. For negative pulses received from the cathode of tube V2, the diode 97 conducts, thus rapidly charging the condenser 95. The condenser 95 retains this charge until the next synchronizing pulse is received.

Tube V4 has its plate connected to lead 86 through resistor 98, and its cathode connected to lead 81 through resistor 99, which may be adjustable as indicated. A resistor 101, in series with the diode 102, connects between the cathodes of tubes V3 and V4. Diode 102 is biased in accordance with the setting of potentiometer 99, and the bias is such that only the central portion of the synchronizing pulses are passed by tubes V4, V5 and V6. The picture information follows the loop about these tubes established by line 111.

Tube V5 has its cathode connected to the grounded lead 81 and its plate connected to the plate supply lead 86 through the resistor 103. The control grid is coupled to the plate of tube V4 through condenser 104, and also is connected to ground through the grid leak resistor 105. The circuitry associated wtih tube V4 serves as a synchronizing pulse separator circuit whereby the wave form on the plate of tube V4 consists primarily of synchronizing pulses together with a small amount of video information. The wave form at the output of tube V5 is formed entirely of synchronizing pulses, and is rectangular.

Tube V6 has its plate connected to the voltage supply lead 86, and its cathode connected to ground through the resistor 106. The control grid of this tube is coupled to the plate of tube V5 through condenser 107, and is connected to ground through the grid leak resistor 108. The cathode of tube V6 is connected to one terminal of the resistor 109, and the other terminal of this resistor is connected by lead 111 to the cathode of tube V3. Resistor 109 functions as a mixer to combine the wave form as it appears at the cathode of tube V3, with the wave form of the amplified synchronizing pulses as they appear on the cathode of tube V6. The result is a wave form which includes the video information, together with increased extensions representing the synchronizing pulses. In other words, the wave form as it appears at the adjustable tap 112, is the wave form illustrated in Figure 2B. Lead 113 connects the tap 112 with one terminal of resistor 114, the other terminal of this resistor connecting to the grounded lead 115.

Tube V7 has its control grid connected to the adjustable tap 116 on the resistor 114, whereby this resistor functions as a voltage divider to adjust the signal voltage on the grid of tube V7. The cathode of tube V7 is connected to ground by biasing resistor 117, which is shunted by the bypass condenser 118. The suppressor grid is directly connected to the cathode. The screen grid is provided with a positive bias and is connected to the plate supply lead 119 through the resistor 120. Bypass condenser 121 connects between the screen grid and ground. The plate of tube V7 is connected to lead 119 through the resistor 122 and high frequency peaking coil 123. The circuitry just described, which is associated with tube V7, forms a suitable video amplifier.

Tube V8 functions as a cathode follower and has its plate connected to lead 119, and its cathode connected to ground through resistors 124 and 125. The control grid is coupled to the plate of tube V7 to condenser 126, and is connected by the grid leak resistor 127 to the point of connection between resistors 124 and 125.

The tube V9 has circuitry whereby it functions as a phase splitter. Also a D.C. restorer circuit is imposed between the tubes V8 and V9. Thus the plate of tube V9 is connected to the voltage supply lead 119 through resistor 128, and the cathode connects to ground through the biasing resistor 129. The control grid of tube V9 is coupled to the cathode of tube V8 by condenser 130. A diode 131, which can be of the crystal type has its plate connected to the control grid of tube V9, and its cathode connected to ground through the condenser 132. Serially connected resistors 133 and 134 connect between leads 119 and 115 to form a voltage divider, and the adjustable tap 135 on resistor 134 connects to the cathode of diode 131. The diode 131, together with condenser 132, functions as a D.C. restorer in the same manner as previously described.

Tubes V10 and V11 and the circuitry associated with the same form a push-pull video amplifier. The plates of both tubes V10 and V11 connect with the voltage supply lead 119. The cathodes of the tubes V10 and V11 connect through resistors 136 and 137 with the negative side of the plate voltage supply. The control grid of tube V10 is connected by lead 138 to the cathode of tube V9. The control grid of tube V11 connects with the plate of tube V9 in series with the gas discharge tubes 139, 140 and 141. The series arrangement of these tubes is shunted by the condenser 142. The gas discharge tubes are fired by current through resistor 143 which is connected to a —150 volt supply. This permits D.C. coupling between the plate of V9 and the control grid of V11, and at the same time provides the proper control grid bias voltage for V11.

The common output lead 146 is connected to the cathodes of the tubes V10 and V11, through the diodes 147 and 148, which are oppositely poled. The circuitry utilizing diodes 147 and 148 is arranged whereby the diodes each conduct when the amplitude of the carrier from the clipper 47 exceeds the instantaneous peak-to-peak amplitude of the bilaterally symmetric push-pull video wave form which now appears between the cathode of tube V10 and the cathode of tube V11. This means that the instantaneous degree of clipping at lead 146 is the greatest when the video signal is at the white level, and is the least when the peak of the synchronizing pulse prevails. Stated in another way, it means that the carrier is modulated downward as a function of the whiteness of the video signal. The clipped carrier from clipper 57 is applied to lead 146, the clipper 57 being supplied a carrier frequency from generator 55 and amplifier 56, as previously described with reference to Figure 1. The amplifier and phase inverter 58, and the push-pull amplifier 59, apply the modulated carrier to the magnetic units of the rotary head. In Figure 4 these units are schematically indicated by the windings 1, 3, 2 and 4. The point of connection between windings 3 and 2 is in effect connected to ground or to a point of neutral potential, by capacitance to ground within the rotary head. The windings of the head units are, therefore, divided into two groups, one group comprising 1 and 3 connected in series between lead 32 and ground, and the other being windings 4 and 2 connected in series between lead 33 and ground. As previously stated, the leads 32 and 33 are coupled to the output of the push-pull amplifier 59.

The network of Figure 4 operates in the same manner as previously described in connection with Figure 1. The modulated carrier envelope is similar to the wave form appearing at lead 42, except that the synchronizing pulses have been stretched and the envelope has mirror symmetry.

Figure 5 illustrates a suitable circuit for one of the amplifier channels of the receiving network, together with suitable electronic switching means. The amplifying circuitry, which in this instance is for channel No. 1, employs vacuum tubes identified as V12 to V18, inclusive. Tube V12 forms with its circuitry a wide band radio frequency amplifier, and tubes V13 and V14, with their circuitry, form amplifiers having a gain which is inversely proportional to the amplitude of the synchronizing pulses. Tube V12 has its plate connected to the plate voltage supply lead 151, in series with the resistors 152 and 153. The point of connection between resistors 152 and 153 is connected to ground through the bypass condenser 154. The control grid of tube V12 is connected to an input terminal and to the lead 66. The cathode is connected to the grounded conductor 155, through the biasing resistor 156. This resistor is shunted by condenser 157.

Tube V13 has its plate connected to the voltage supply lead 151 through the series resistors 158 and 159. The point of connection between these resistors is connected to ground through condenser 160. The cathode of tube V13 is directly connected to the suppressor grid, and to ground through the resistor 161, which is shunted by condenser 162. The control grid of tube V13 is coupled to the plate of tube V12 through the condenser 163, and is connected to the lead 164, through the grid resistor 165. The screen grid of tube V13 is connected to the voltage supply lead 166, through the resistor 167, and is also connected to ground through the condenser 168.

Tube V14 has its plate connected to the voltage supply lead 151 through the series resistors 169 and 170, which also connect with the condenser 171, corresponding to condensers 154 and 160. The cathode of V14 is likewise directly connected to the suppressor grid and is connected to ground through the biasing resistor 172, the latter being shunted by condenser 173. The screen grid of tube V14 is likewise connected to the voltage supply lead 166 through the resistor 174, and is connected to the grounded bypass condenser 175. The control grid of tube V14 is coupled to the plate of tube V13 through the coupling condenser 176, and is connected to lead 164 through the resistor 177.

Tube V15 has its plate directly connected to the lead 151, and its cathode connected to lead 155 through the series resistors 178 and 179. The control grid of tube V15 is coupled to the plate of tube V14 through condenser 180, and is connected to the point of connection between resistors 178 and 179 through the grid leak resistor 181.

Tube V16 likewise has its plate directly connected to lead 151 and its cathode connected to ground through the series connected resistors 182 and 183. The control grid is coupled to the cathode of tube V15 through the condenser 184, and is connected to the point of connection between resistors 182 and 183 through the grid leak resistor 185. The cathode of tube V16 is also connected to ground through the resistor 186, which has an adjustable tap 187.

The plate of tube V17 connects to the voltage supply lead 151 through the series resistors 188 and 189, which have the point of connection between the same connected to ground through the condenser 190. The cathode of tube V17 connects with the suppressor grid, and to ground through the resistor 191, the latter being shunted by condenser 192. The control grid of tube V17 is coupled to the tap 187 on resistor 186, by the coupling condenser 193, and is connected to ground through the grid leak resistor 194. The screen grid of tube V17 is connected to the plate supply lead 166 through resistor 195, and also connects with the grounded bypass condenser 196.

The plate of tube V18 connects directly with the voltage supply lead 151, and the cathode is connected to ground through the series resistors 197 and 198. The control grid is coupled to the plate of tube V17 through condenser 199, and also connects with the point of connection between resistors 197 and 198, through the resistor 200. A diode 201, which can be of the crystal type, has its cathode directly connected to the cathode of tube V12, and its plate connected to the lead 164 and to the grounded condenser 201a. A potentiometer 202 has its one terminal connected to grounded lead 155, and its other terminal connected to the voltage supply lead 151, through the resistor 203. The adjustable tap or contact 204 of the potentiometer 202 is connected to the plate of diode 201, through the resistor 205.

The cathode of tube V15 is also connected to ground through the resistor 206, and the tap 207 on this resistor is connected to the output lead 209, through the condenser 208. A similar lead 211 extends from the output of channel No. 2, the circuitry of which can be the same as just described.

Operation of the network incorporating tubes V12 to V18, inclusive, is as follows: The modulated carrier signal taken from the magnetic tape by the rotary head is applied to the input of the cascade amplifier formed by tubes V12–V14. Amplifier tube V15 functions as a cathode follower to supply signal to the switching tube V20 by way of lead 209, and to the input of tube V16. Tube V16 is likewise a cathode follower and functions as a buffer for the signal being supplied to tube V17. Tube V17 is an ordinary wide band video amplifier which amplifies the entire composite video signal, including the picture information and the synchronizing pulses. Tube V18 is a cathode follower employed to provide a low impedance source for the diode 201. This diode, in conjunction with the condenser 201a, constitutes a fast charging and slow discharging circuit means which is capable of charging up to an amplitude equal to the amplitude of the synchronizing pulse, and maintaining such charge throughout the duration of one scanning period of the television picture tube used with the system (i.e. 63.5 microseconds). Lead 164, therefore, carries D.C. biasing voltage which is a function of the amplitude of the synchronizing pulses. The circuit arrangement associated with diode 201 is such that maximum amplitude of synchronizing pulses is accomplished by minimum gain through tubes V13 and V14. The total effect of this regulating process is that the peak to peak amplitude measured at the peak of the synchronizing pulse is maintained virtually constant as the signal is supplied to the control grid of tube V20. The same process takes place in the second channel which provides signal for tube V19. In this manner the peak to peak amplitude of the synchronizing signal applied to the leads 209 and 211 from the two channels Nos. 1 and 2 is maintained constant, irrespective of slight variations in signal strength from the different magnetic units as they sweep over the magnetic tape, such as may be due to slight differences in the contact pressure between the units and the tape, or to other causes, not specifically related to the signal strength applied to the units during recording.

A suitable form of electronic switching means is also illustrated in Figure 5, and employs the tubes V19 and V20. As previously described in Figure 1, the amplifier and clipper 78 has its input connected to the photoelectric means 34, and its output connected to the phase splitter 79. The output of the phase splitter is coupled by condensers 212 and 213 to corresponding grids of the suppresser tubes V19 and V20. The plates of the tubes V19 and V20 are connected to the plate voltage supply lead 214 through the series connected resistors 215 and 216. The screen grids of the tubes are directly connected together and through a series resistor 210 to the point of connection between resistors 215 and 216. This point of connection also connects the ground through the bypass condenser 217. The control grids of the tubes V19 and V20 are connected to the leads 209 and 211, and the bias upon these grids is provided by suitable adjustable means, such as the series connected resistors 220 and 221, which have the point of connection between the same connected to a source of biasing voltage as illustrated, and the remote terminals grounded. The taps of the resistors 220 and 221 are connected to the grids 3 of tubes V19 and V20, through the series resistors 222 and 223. The cathodes of tubes V19 and V20 are connected to ground through the biasing resistors 224 and 225, which are shunted by bypass condensers 226 and 227. The input of the demodulator 73, previously described with reference to Figure 1, is coupled to the plates of both tubes V19 and V20 through condenser 228.

As previously described, pulses of square or rectangular wave form are supplied to the amplifier and clipper 78, from the photoelectric means. Pulses thus applied to the suppressor grids of tubes V19 and V20 serve to make these tubes alternately conducting and non-conducting, thereby passing signals successively and alternately from the leads 209 and 211. The switching of the tubes from conducting to non-conducting occurs instantaneously, so that there is no appreciable interruption to the signal thus applied to the input of the demodulator 73. As will be presently explained, the cutoff is so timed that reproduced signal from the units of the rotary magnetic head which are taken from track portions representing duplicate recording, are not passed by the switching tubes V19 and V20. In other words, the signal passed by tubes V19 and V20 corresponds to the major portions of the recorded track which carry all of the recorded picture intelligence, but without duplication.

The demodulator 73 can be of conventional construction, and can consist for example of a phase inverter together with diode detectors. The output of such a demodulator has components at twice the carrier frequency. Filter 74 is adjusted to reject such frequency components.

Figures 9 to 15, inclusive, illustrate a suitable rotary magnetic head and associated parts. The assembly 330 includes the rotary magnetic head, and is mounted upon the panel 331. This panel also carries turntables for receiving the supply and takeup reels 332 and 333. The magnetic tape is guided to pass over one side of the guide platen 13, which represents the coated side of the tape, to the rotary magnetic heads. As the tape leaves the platen 13, it passes about the guide roller 16, and is looped about the motor driven capstan 17. After leaving the capstan 17 the tape passes in contact with the magnetic erase and record heads 23 and 24, which have previously been described with reference to Figure 1. Suitable supplemental tape guiding means can be employed, including the guide stud 338, and the studs 340, 341 and 342, which are adjacent the magnetic erase and record heads 23 and 24. The heads 23 and 24 engage one margin of the tape along the same linear track area. Similar heads can be provided for engaging the other margin of the tape for recording sound frequencies.

The electric motor 12 of the unit 330 is of the alternating current induction type, adapted to maintain a speed in accordance with the frequency of the exciting current. This motor is fixed within the mounting 344, which in turn is carried by the panel 331. The rotary head includes the annular member 345, which has circumferentially spaced recesses 346 formed about its periphery. These recesses serve to accommodate the magnetic head units 347. Each of these units can be constructed in a manner similar to the magnetic recording and/or playback heads such as are used on regular magnetic tape machines. More particularly, each unit consists of a core of suitable magnetic material, such as ferrite, together with a winding having terminals adapted to connect with a pair of output terminals through commutating means. The core provides a pair of pole tips 348, which are relatively narrow as measured in a radial direction, and which can be made of mu metal.

There is a small gap between adjacent pole pieces, occupied by an insert of nonmagnetic material, and this gap extends in a circumferential direction at right angles to the plane of rotation. All of the magnetic head units have their pole tips at a fixed radial distance from the axis of the rotatable member 345. The central hub 350 of member 345 is fixed by suitable means to the shaft 351 of the motor. As shown particularly in Figures 12 and 15, the pole tips 348 extend a short distance from the exterior face of member 345. A retaining band or ring 349 is fixed upon the member 345, and serves to retain the units 347 within the recesses 346.

The mounting 344 also serves to support the annular housing 352, which generally surrounds the ring 349. This housing also serves to accommodate the commutator assembly 353, which occupies the space between the rotary member 345 and the adjacent end of the motor 12. As shown in Figure 14, the assembly 353 consists of an outer shell 354, which can be made of suitable insulating material, and which has a threaded annular portion 355, for attachment to a stationary part of the motor 12. The interior of shell 354 serves to mount the annular metal members 356, 357, 358 and 359, which are spaced axially. A hub 361 forms an insulating mounting for the annular metal members 362 and 363. Member 362 is interposed between members 356 and 357, and member 363 interposed between 358 and 359. The members 362 and 363 are adapted to be electrically connected by leads 364 and 365, to the several magnetic head units. Assuming that the head units are numbered 1, 2, 3 and 4, in the manner illustrated in Figure 4, the heads are serially connected in two groups in the manner illustrated in Figure 14. One group, consisting of heads 1 and 3, can have one terminal of head 1 connected to lead 364, and its other terminal connected to unit 3. The other terminal of unit 3 can connect to the ground through the motor shaft. One terminal of head 4 connects with lead 365, and the other terminal connects to one terminal of head 2. The other terminal of head 2 likewise connects to the motor shaft. The annular members 356 and 357 are connected together and to the lead 63 of Figure 1. In other words, the connection is to the input of channel No. 1. Members 358 and 359 are similarly connected together and to the input lead 64, which connects with channel No. 2.

It is desirable to provide additional annular electrostatic shield members 366, 367, 368 and 369. Members 367 and 368 are interposed between the members 357 and 358. Members 366 and 369 are disposed adjacent members 356 and 359.

The capacitative relationship between member 362 and two members 356 and 357, serves to transfer signal energy from load 364 to the lead 63. Similarly the capacitative relationship between member 363 and the members 358 and 359, serves to transfer signal energy from lead 365 to the lead 64. Shields 366 and 369 serve to isolate the other members from external electrostatic charges. Members 367 and 368 serve to isolate members 357 and 358 from each other. The electrostatic shield elements can all be connected to a ground in common with the cathode circuits.

The photoelectric means incorporated in the assembly 330 is illustrated particularly in Figures 10 to 13. It consists of a housing member 371, which is secured to the housing 352, and which is provided with a bore 372 to receive the photoelectric tube 373. This tube has a base 374 for attachment to member 371. The housing member 371 is also provided with a bore 375 which serves to accommodate the mounting tube 376 for the lamp 377, and the light focusing lens 378. The outer periphery of the ring 349 is provided with darkened areas B1 and B2, and relatively light areas L1 and L2. These light and dark areas are all of equal circumferential length, and they have sharp lines of demarcation between them, which extend parallel to the axis of rotation. The light from lamp 377 is focused by lens 378 on a relatively small band or strip on the periphery of ring 349, and the reflected light falls upon the photoelectric tube 373.

The arrangement just described is schematically illustrated in Figure 7. The photoelectric tube 373 has its one element grounded, and its other element connected to the control grid of the cathode follower tube 381, through the coupling condenser 382. The cathode of tube 381 is connected to ground through the series resistors 383 and 384. The control grid is also connected to the point of connection between the latter resistors, by grid leak resistor 385. Lead 36 connects to the cathode, and can be shielded as illustrated. It will be evident that the tube 381 functions as a cathode follower to supply pulses to the additional amplifying and clipping means 78 and 79 of Figure 1.

Previous reference has been made to the way in which the tape 10 moves between the rotary head and the platen 13, and is contacted by the magnetic head units. It is desirable to provide the contact face of the platen 13 with an arcuate groove 391, whereby the magnetic tape spans this recess as it is swept by the magnetic head units. The contact of each head unit with the tape should provide a substantially constant pressure for the entire sweep from one edge of the tape to the other. Likewise the contact pressure for successive head units should be as nearly constant as possible. In the operation of the apparatus care is taken to maintain a substantially constant linear tension upon the tape.

Figure 8 illustrates a portion of the magnetic tape with sweep areas upon the same. The shaded areas 392 represent the arcuate track areas sweep by the magnetic head units, and it will be noted that these areas are spaced apart in the direction of the length of the tape. In one particular instance, where the magnetic tape was 2 inches in width, each track area had a width as measured lengthwise of the tape of 10 mils. Along the center of the tape the adjacent edges of the tracks were spaced 15 mils apart. The dotted lines 393 represent the demarcation between the tracks which carry the picture intelligence, and the marginal edge portions over which erase heads have operated. Switching operations occur shortly before the heads reach the lines 393. One marginal edge can be used for the recording of audio-frequencies, and the other for recording control frequencies as previously described. In both instances an erasing operation must be carried out prior to making the desired marginal recording, but the erasing operation eliminates most but not all of the arcuate track portions carrying duplicated picture information. Such control and sound records are schematically illustrated in Figure 8.

In the system illustrated in Figure 6 more accurate means is used to control the speed of the rotary head. Thus in this instance the input of the power amplifier 22 is supplied with voltages of a fixed frequency and controlled-phase nature from the multivibrator oscillator generator 401.

The motor control system illustrated in Figure 6 makes possible more accurate control over the driving of the rotary magnetic head. In this instance the power amplifier 22, which supplies alternating current to the driving motor 12, is excited by pulses of a fixed frequency and controlled phase-nature from the multivibrator 401. This multivibrator is one of the type having a frequency of operation dependent upon the voltage level applied to the specified element, in this case represented by the voltage on the lead 402. A suitable phase comparator 403 applies a predetermined voltage to the lead 402, depending upon the phase difference between alternating voltages applied to the phase comparator by way of the leads 404 and 405. Lead 405 connects to the output of the amplifier and clipper 406, the input of which is connected through switch 8 with the lead 36 from the photoelectric means 34. The lead 404 connects to the output of the multivibrator. Thus when a deviation tends to occur between the output phase of the multivibrator 401, and the phase on lead 36 (which is precisely in synchronism with the driving speed) a voltage variation occurs on the lead 402 which affects the multivibrator 401 in such a manner as to cause an automatic compensation. For example application of a correcting signal serves to trigger the multivibrator sooner than it would have been, but the time period between successive pulses remains the same thereafter except that they are advanced on the time base by a constant degree. Pulses from multivibrator 401 are also supplied through the tuned circuit 407, to the record amplifier 408. The tuned circuit serves to shape the wave form to cause it to approximate a sine wave. This record amplifier supplies current of a fixed frequency to the recording head 24, as in Figure 1.

During playback operation, the switch S9 connects the input of power amplifier 22 with the output of the phasing control 409. The record amplifier 408 is disconnected from the erase head 23 by switch S10, and the head 24 is connected by switch S11 to the input of the reproducing amplifier 410. The output of this amplifier is subjected to clipping at 411, and after being passed through a tuned circuit 412 for wave shaping, it is applied to the multivibrator 413. The output of this multivibrator is applied through the phasing control 409 to the power amplifier 22.

The system described above in Figure 6, particularly with respect to the way in which the current supplied to the motor 12 is controlled as to frequency, makes for more accurate and constant speed for the rotary magnetic head during recording. Particularly it avoids hunting, and variations in speed such as are occasioned because of slight differences in applied torque. Thus if one should suddenly increase the torque applied to the rotary head, as by an increase in friction, there would be a tendency for the motor to lose speed, but such a loss in speed is immediately reflected in a change in voltage applied to lead 402, with the result that the frequency of the multivibrator is increased a slight amount to immediately apply greater driving torque and thereby maintain the speed constant.

We claim:

1. In a broad band recording system, a magnetic tape, means for driving said tape at a predetermined linear speed, means including a rotary head for magnetically recording signal variations on said tape corresponding to a visual image, said rotary head including a plurality of circumferentially spaced transducer units, said units being adapted to successively sweep across said magnetic tape along tracks extending laterally of said tape and spaced in the direction of the length thereof, and means for applying signal frequencies to said units to form successive records on said tracks, means for reproducing major portions but not all of said tracks, and means for combining the reproductions of said major portions without overlap as to time to form a continuous reproduction of the recorded signals.

2. In a system of the character described in which signals over a broad frequency band are recorded on a magnetic tape, the recording being in the form of successive tracks extending crosswise of said tape and spaced in the direction of the length of said tape, means for reproducing said recording comprising a head adapted to be rotated at a predetermined speed, a plurality of circumferentially spaced magnetic transducers units carried by the head and adapted to successively sweep over said tracks, amplifying means forming at least two amplifying channels having their inputs effectively connected to groups of said magnetic units, on-off switching means associated with each channel to render the same effective or ineffective, pulse generating means for controlling said switching means responsive to rotation of said head whereby said channels are successively made effective, and circuit means for combining the output signals of said channels.

3. A system as in claim 2 in which four of said magnetic transducers units are provided on said rotary head, said units being divided into two groups of two units each, the units of each group being serially connected.

4. A system as in claim 2 in which said switching means includes electronic switching means controlled by pulses synchronized with the rotation of said head, and in which means is provided for generating such pulses.

5. A system as in claim 4 in which said means for generating pulses is of the photoelectric type having a light beam modifying member rotatable with said head, 6. In a visual image system, a magnetic tape, means serving to provide a signal wave form including picture information and synchronizing pulses, means serving to modify said wave form by the extension of portions thereof representing said synchronizing pulses, a source of carrier frequency, means serving to modulate said carrier frequency in accordance with the modified wave form, and means serving to record the resulting modulated carrier on successive single track portions of a magnetic tape.

7. In a broad-band system of the character described in which a record tape is employed having successive spaced record track portions recorded thereon, said track portions extending between the edges of the said tape and said track portions representing a recorded signal, transducer means including a rotary head and a plurality of circumferentially spaced transducer units carried by said head, tape transport means for moving said tape relative to said head whereby said units scan said track portions successively, reproducing circuitry connected to said units for reproducing a continuous composite signal from output signals provided by said transducer units, said circuitry including switching means of the on-off type responsive to application of switching pulses for causing said circuitry to be effective during the major part of the sweep of a transducer unit across a track portion to reproduce that portion of the signal recorded thereon, and means for generating switching pulses in synchronism with the rotation of said head and for applying said switching pulses to said switching means.

8. A system as in claim 7 in which said circuitry comprises a plurality of signal reproducing channels, and in which said switching means includes electronic switching devices serving to render said channels successively effective and ineffective to pass a signal corresponding to said major part of the sweep of each unit.

References Cited in the file of this patent

UNITED STATES PATENTS

| | | |
|---|---|---|
| 1,820,647 | Brown | Aug. 25, 1931 |
| 1,916,510 | Hansen | July 4, 1933 |
| 2,245,286 | Marzocchi | June 10, 1941 |
| 2,349,886 | Roberts | May 30, 1944 |
| 2,517,808 | Sziklai | Aug. 8, 1950 |
| 2,697,754 | Ranger | Dec. 21, 1954 |
| 2,769,856 | Artzt | Nov. 6, 1956 |

OTHER REFERENCES

RCA Review, June 1953, vol. XIV, No. 3, pages 171–174, 195.